United States Patent [19]
Hara

[11] Patent Number: 6,044,455
[45] Date of Patent: Mar. 28, 2000

[54] CENTRAL PROCESSING UNIT ADAPTED FOR PIPELINE PROCESS

[75] Inventor: Kazuhiko Hara, Hyogo, Japan

[73] Assignee: Ricoh Company, Ltd., Tokyo, Japan

[21] Appl. No.: 08/956,725

[22] Filed: Oct. 23, 1997

[30] Foreign Application Priority Data

Oct. 25, 1996 [JP] Japan ................................. 8-283657

[51] Int. Cl.⁷ ....................................................... G06F 9/32
[52] U.S. Cl. ........................... 712/213; 712/207; 711/220
[58] Field of Search ................................. 711/213, 214, 711/215, 219, 132, 220; 395/394; 712/213, 205, 207, 211, 230

[56] References Cited

U.S. PATENT DOCUMENTS

| | | | |
|---|---|---|---|
| 4,133,028 | 1/1979 | Bernstein | 395/284 |
| 4,538,223 | 8/1985 | Vahlstrom et al. | 711/214 |
| 5,357,620 | 10/1994 | Suzuki | 711/220 |
| 5,522,053 | 5/1996 | Poshida et al. | 711/213 |

FOREIGN PATENT DOCUMENTS

| | | |
|---|---|---|
| 61-208129 | 9/1986 | Japan . |
| 4184534 | 7/1992 | Japan . |
| 6337783 | 12/1994 | Japan . |

*Primary Examiner*—William M. Treat
*Attorney, Agent, or Firm*—Cooper & Dunham LLP

[57] ABSTRACT

A central processing unit includes an adder dedicated to address calculation provided separately from an ALU, a first address data route connected to a program counter and a stack pointer register, a second address data route connected to a prefetch que, a predecoder for determining whether an instruction to be executed calls for an addressing mode whereby a value in the program counter or the SP register is added to an immediate address in an instruction code. With this arrangement, if the addressing mode is called for, address calculation by the adder is performed concurrently with computation using an operand for another instruction, in accordance with a control signal output by the predecoder.

6 Claims, 3 Drawing Sheets

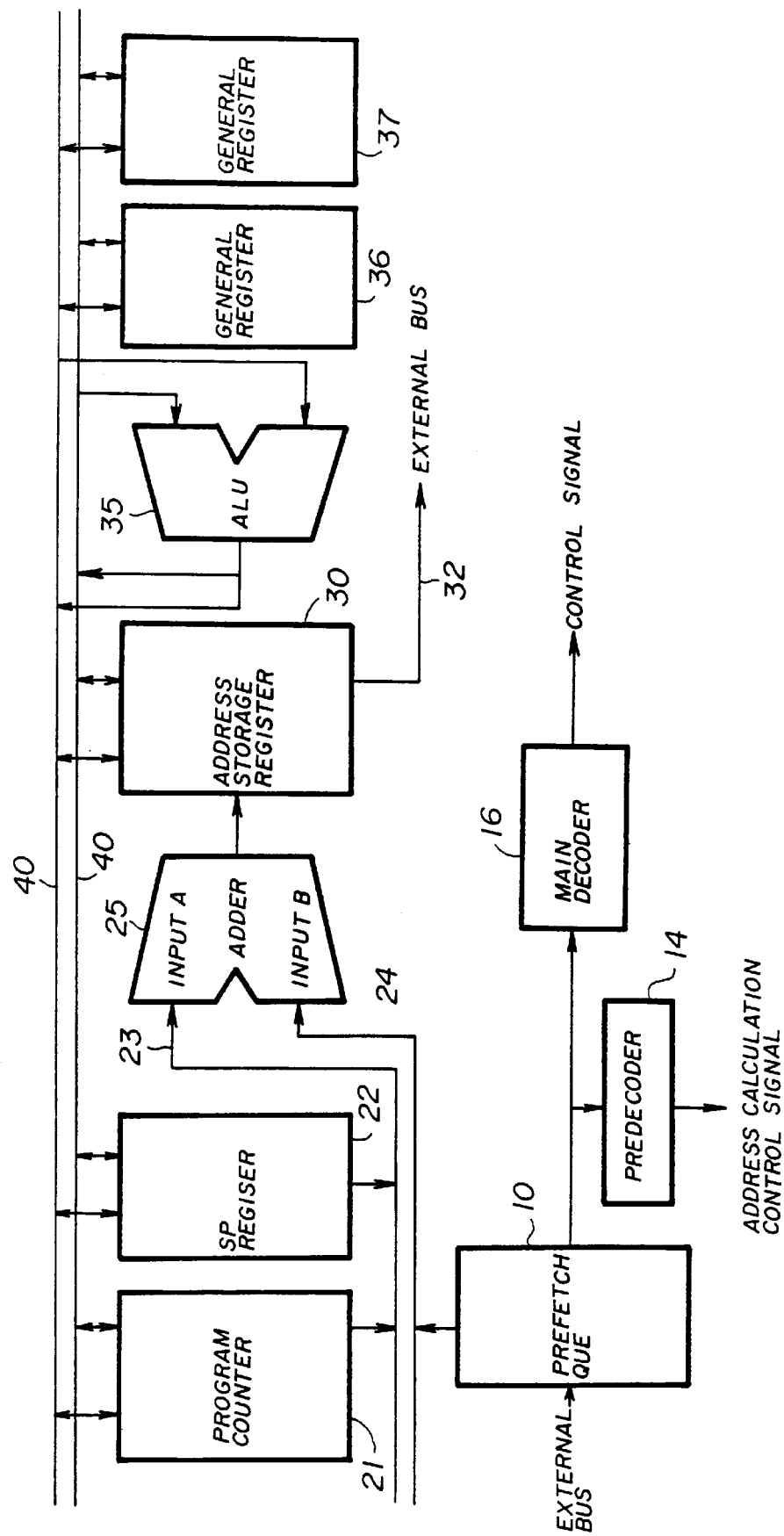

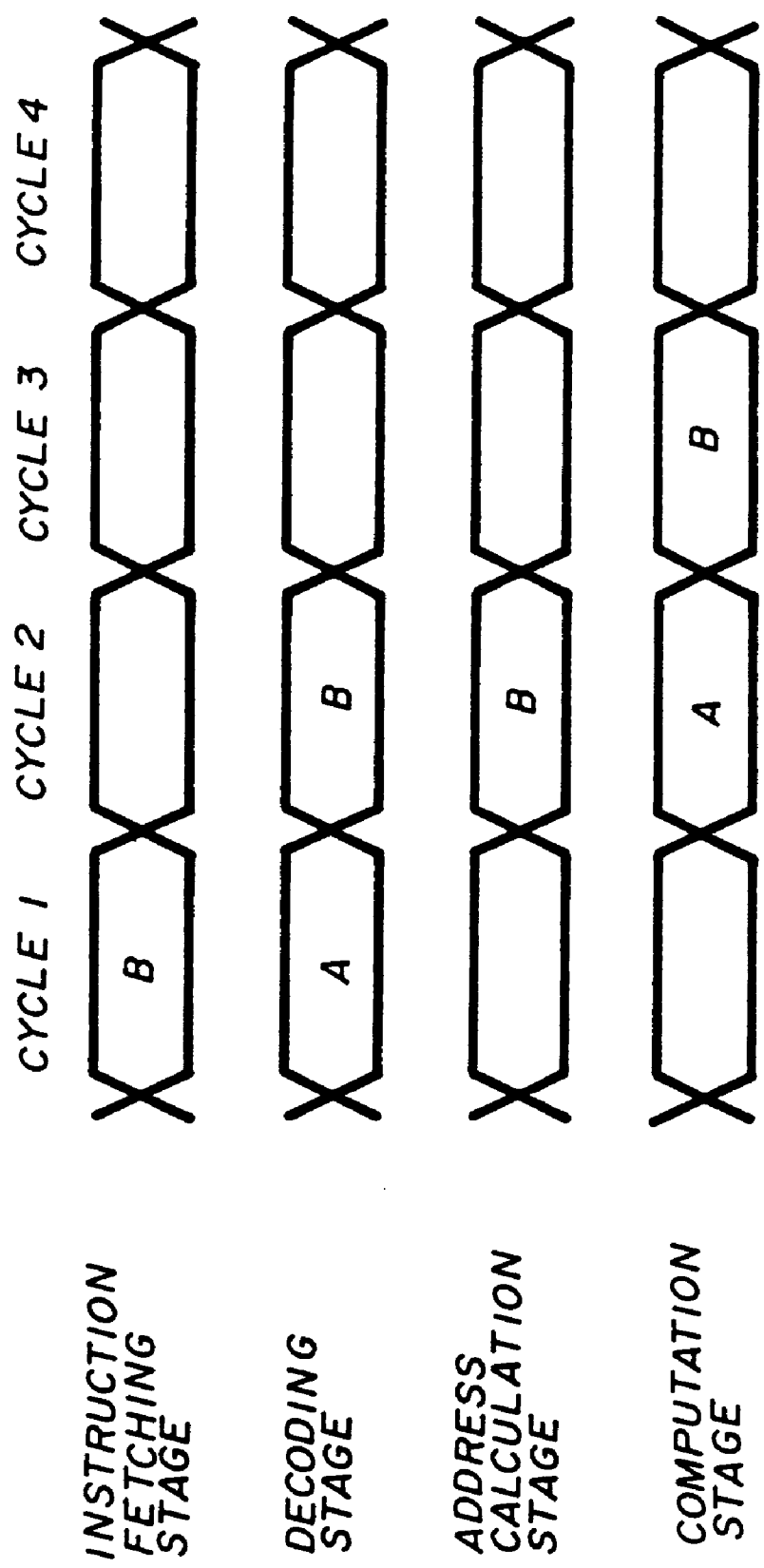

CENTRAL PROCESSING UNIT ADAPTED FOR PIPELINE PROCESS

BACKGROUND OF THE INVENTION

1. Field of the Invention

The present invention generally relates to central processing units (CPUs) such as a microprocessor for performing a pipeline process and, more particularly, to a central processing unit for performing a pipeline process at an increased processing speed.

2. Description of the Related Art

A pipeline process is used as one of the means to improve the performance of a central processing unit such as a microprocessor. A pipeline process is designed to reduce a time required for processing each instruction when a plurality of instructions are successively executed, by dividing a sequence that includes reading, encoding and executing an instruction into different stages, and by concurrently performing stages of the plurality of instructions.

When a CPU executes an instruction, the CPU must specify data to be used in the execution, that is, the CPU must specify an address of an operand. The CPUs are characterized by different modes of addressing (methods of specifying addresses). An address of an operand for a given instruction is specified using one of the addressing modes provided by the CPU executing the instruction. In executing an instruction, the CPU calculates the address (effective address) of the operand for the instruction in accordance with the addressing mode for the instruction and using address data specified by the instruction.

An arithmetic unit is used as required in order to calculate the effective address. A CPU not provided with an arithmetic unit dedicated to address calculation uses an arithmetic and logic unit (ALU) used for computation using an operand (data process) in order to calculate an address. In such a case, computation using the operand and address calculation are processed in the same stage in the pipeline. As a result, address calculation of an instruction has to wait until computation using an operand for a preceding instruction is completed. A further description will be given with reference to a timing chart of FIG. 1.

FIG. 1 is a timing chart showing a pipeline process performed by a central processing unit according to the related art which is not equipped with an arithmetic unit dedicated to address calculation.

The process of FIG. 1 comprises an instruction fetching stage, a decoding stage and a computational stage. In cycle 1, an instruction A is decoded and a next instruction B is fetched. In the next cycle 2, data processing for the instruction A is performed and the instruction B is decoded. Since the central processing unit is not equipped with an arithmetic calculation unit dedicated to address calculation, it cannot calculate an address of an operand for the instruction B in cycle 2. Therefore, the address calculation for the instruction B is performed by the ALU in the next cycle 3. The computation for the instruction B is performed in the next cycle 4. If any of the stages is executed twice or more for an instruction as shown in FIG. 1, where the computational stage performed by the ALU is executed twice for the instruction B, the stages (in this case, the instruction fetching stage and the decoding stage) preceding the stage executed a multiple of times has to wait, thereby stalling the operation.

One approach to avoiding such a halt may be to assign address calculation and computation using the operand to different stages. With this arrangement, when an instruction is in the computational stage, an address of an operand for a next instruction can be calculated at the separate address calculation stage.

However, such an approach requires an arithmetic unit dedicated to address calculation (hereinafter, referred to as an address arithmetic unit) to be added to the CPU since the ALU cannot be used for address calculation. An address arithmetic unit should be capable of performing an address calculation for all types of addressing modes provided by the CPU. In case a complex addressing mode is provided, the construction of the address arithmetic unit and associated data routes become accordingly complex. For example, when a target address is produced by adding a register value to another register value, data routes from these registers to the address arithmetic unit should be provided. If one of the values to be added to produce a target address is an immediate value set in the instruction code instead of a register value, a data route for feeding the immediate value to the address arithmetic unit should be provided. If a plurality of calculations are necessary in order to obtain a target address, means for temporarily storing a calculation result and a data route for supplying the calculation result back to the address arithmetic unit should also be provided.

If an address of an operand is calculated according to an addressing mode using a specific register provided in the CPU as a base register, a problem associated with a write-after-read hazard must be considered. The write-after-read hazard occurs when an instruction updates a value in a register provided in the CPU. A subsequent instruction should use an updated value. When a plurality of stages of a pipeline process overlap, however, there is a likelihood that the subsequent instruction refers to the register before the preceding instruction has time to update the value. This problem may be overcome by detecting a write-after-read hazard and stalling the subsequent stages, or by forwarding the data to be updated to the subsequent stage bypassing the register.

As described above, assigning address calculation and computation using an operand to different stages requires an address arithmetic unit adapted for all types of addressing provided by the CPU, resulting in an increase in the circuit scale or requires more complex pipeline process control in order to deal with the problem associated with a write-after-read hazard in the pipeline process. As a result, the CPU cost is increased.

SUMMARY OF THE INVENTION

Accordingly, an object of the present invention is to provide a central processing unit in which the aforementioned problems are eliminated.

Another and more specific object is to provide a central processing unit in which an increase in the circuit scale or complexity of the control is reduced, and in which the processing speed is improved by concurrently performing address calculation and computation using an operand in a pipeline process.

The aforementioned objects can be achieved by a central processing unit for performing a pipeline process by dividing a sequence including reading, decoding and executing an instruction into different stages, comprising: a plurality of registers; an arithmetic and logic unit for performing a computation using an operand for an instruction to be executed, an adder dedicated to address calculation provided separately from the arithmetic and logic unit so as to calculate an address of the operand; a first data route for transferring data stored in a specific one of the plurality of registers to the adder; a second data route for transferring an immediate address set in an immediate address field of the instruction to be executed to the adder; determining means for determining whether the address of the operand for the instruction can be calculated by adding the immediate address to the data stored in the specific register; transferring means for transferring, if the determining means yields an affirmative answer, the data stored in the specific register to the adder via the first data route, and for transferring the immediate address to the adder via the second data route; and controlling means for controlling the first and second data routes to transfer, if the determining means yields an affirmative answer, the data stored in the specific register to the adder, and to transfer the immediate address to the adder, so as to cause the adder to calculate the address based on the data and the immediate address transferred to the adder.

The present invention is suitably used when the instruction calls for the register indirect with displacement addressing mode, where an address of an operand for an instruction is calculated by adding data in a specific register to an immediate address in the instruction code. The first and second address data routes and the adder dedicated to address calculation are used to calculate an address for a given instruction concurrently with operand computation for another instruction. In this way, the number of cycles required to execute the given instruction can be reduced by one. It is also to be appreciated in the present invention that the mechanism for concurrently performing address calculation and computation using an operand is implemented by small-scale hardware including the adder dedicated to address calculation, and the first and second address data routes. Thus, the processing speed of the central processing unit can be improved by hardware expansion on a relatively limited scale.

In a preferred embodiment of the invention, a significant increase in the processing speed is achieved by using one of a program counter, a stack pointer register and a frame pointer register as the specific register mentioned above. It is to be noted that addressing whereby a value in the program counter is added to an immediate address is frequently used in a relative jump specified by a branch instruction. Addressing whereby a value in the stack pointer register is added to the immediate address is frequently used to refer to information stored in a stack. Addressing whereby a value in the frame pointer register is added to the immediate address is frequently used to refer to information in a stack frame created by a function call (subroutine call) of a high-level language. Therefore, the cycle count reduction for instructions calling for these types of addressing contributes significantly to the improvement of the processing speed of the central processing unit.

By confining registers used for address calculation by the adder dedicated to address calculation to the program counter, the stack pointer register, the frame pointer register and other registers excluding the general register, updating of a value in the register may be configured to occur only in the first half of the cycle before it is read in the process of address calculation. Accordingly, it is possible to prevent a hazard from occurring while preventing pipeline process control from becoming excessively complex.

Thus, by confining addressing modes involving concurrent address calculation and operand computation to a frequently used mode (that is, by confining registers used in address calculation to certain specific registers), a time required for address calculation is reduced while preventing excessive expansion of hardware dedicated to address calculation and excessively complex pipeline process control. Accordingly, a central processing unit with an improved processing speed is provided at a small additional cost.

BRIEF DESCRIPTION OF THE DRAWINGS

Other objects and further features of the present invention will be apparent from the following detailed description when read in conjunction with the accompanying drawings, in which:

FIG. 2 is a block diagram showing a construction of a microprocessor according to an embodiment of the present invention; and FIG. 3 is a timing chart showing a pipeline process performed by the microprocessor according to the embodiment.

DESCRIPTION OF THE PREFERRED EMBODIMENTS

Figure 1:
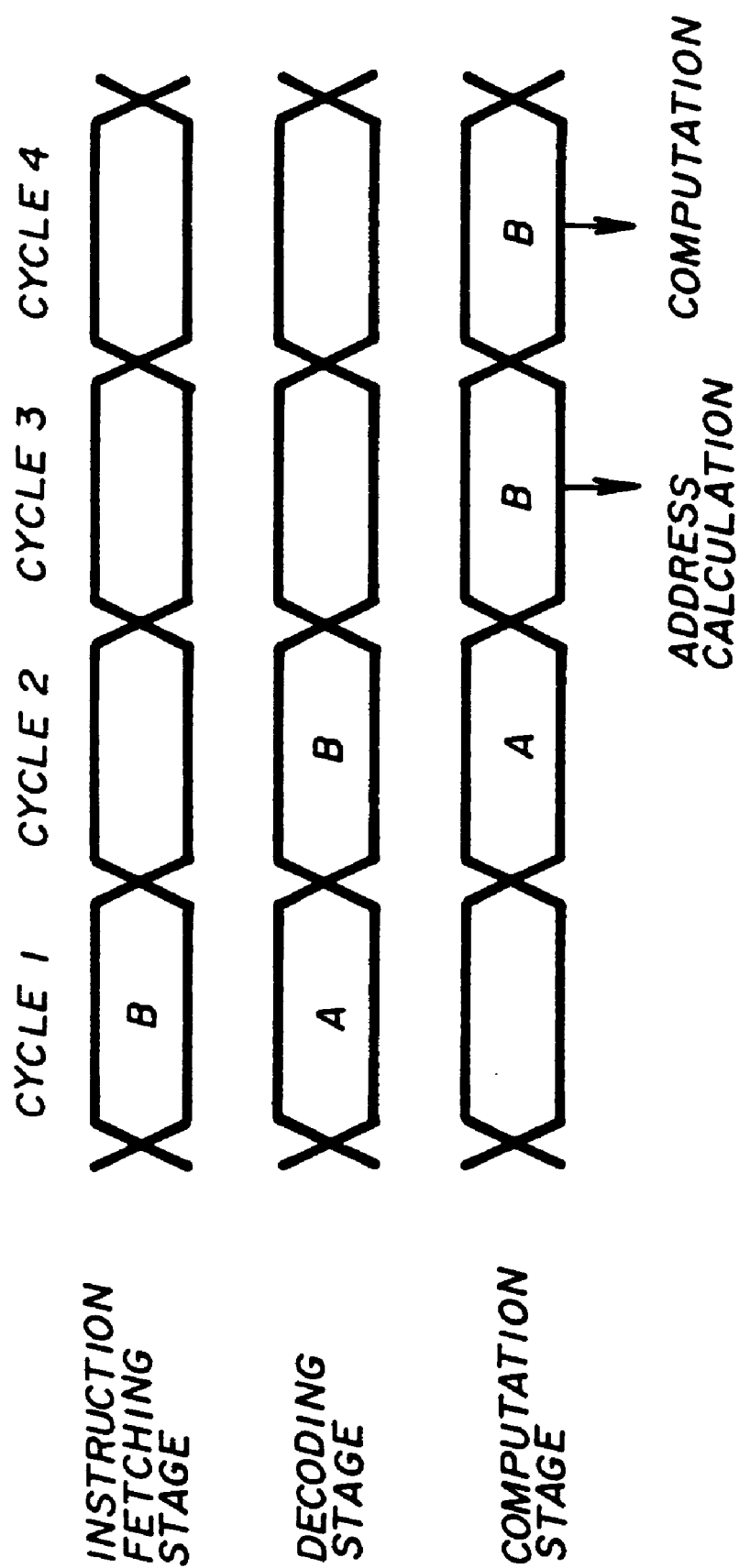
FIG. 1 is a timing chart showing a pipeline process performed by a central processing unit according to the related art.

FIG. 2 is a block diagram showing a construction of a microprocessor according to an embodiment of the present invention. The microprocessor promotes an instruction stored in an external memory (not shown) and stores the instruction in a prefetch que 10. The microprocessor also comprises a main decoder 16 for generating a signal for controlling components of the microprocessor for execution of the instruction, and a predocoder 14 for performing partial decoding of the instruction in order to determine a type of address calculation prior to the decoding by the main decoder 16. The microprocessor also comprises an arithmetic and logic unit (ALU) 35 (data processing arithmetic unit) for computation using an operand, and an adder 25 dedicated to address calculation (hereinafter, referred to as an address adder) for calculating an address of the operand. Internal registers provided in the microprocessor are a program counter 21, a stack pointer register (hereinafter, referred to as an SP register) 22, an address storage register 30 and general registers 36 and 37. Data routes include an internal data bus 40 for transferring data between the ALU 35 and the internal registers, an internal address bus 32 for transferring an address stored in the address storage register 30 to an external device, a first address data route 23 for feeding data stored in the program counter 21 or the SP register 22 to the address adder 25, and a second address data route 24 for feeding an immediate address set in the instruction code stored in the prefetch que 10 to the address adder 25.

A description will now be given, with reference to FIG. 3, of an operation of the microprocessor according to the embodiment of the present invention constructed as described above.

FIG. 3 is a timing chart showing a pipeline process performed by the microprocessor according to the embodiment. For ease of understanding, FIG. 3 shows the instruction fetching stage, the decoding stage, the address calculation stage and the computational stage independently. However, according to the embodiment of the present invention, the decoding stage and the address calculation stage are actually the same pipeline stage.

An instruction stored in a main memory (not shown) is promoted in accordance with a value in the program counter 21 and stored in the prefetch que 10 via the external bus. The instruction stored in the prefetch que 10 is decoded by the predecoder 14 and the main decoder 16 successively. In cycle 1 shown in FIG. 3, the instruction B is in the instruction fetching stage in which the instruction B is read out from the main memory and stored in the prefetch que 10. In cycle 1, the immediately preceding instruction A is in the decoding stage in which the instruction A is decoded by the main decoder 16. Since the decoding stage and the address calculation stage are actually the same pipeline stage as described above, address calculation of an operand for the decoded instruction is concurrently performed in cycle 1. However, it is assumed that the instruction A in the example of FIG. 3 does not require address calculation of an operand.

In cycle 2, the instruction A proceeds to the computational stage in which computation using the operand for the instruction A is performed by the ALU 35 based on the result of decoding yielded by the main decoder 16. The instruction B proceeds to the decoding stage in which the instruction B is decoded by the main decoder 16. At this stage, the predecoder 14 also performs partial decoding of the instruction B so that the result of decoding is used to calculate the address in the same cycle. The predecoder 14 determines whether the address of the operand for the instruction B can be calculated by the address adder 25. The predecoder also retrieves information indicating the register that is to be used in calculating the address. As described before, the address adder 25 is connected to the first address data route 23 for receiving data from the program counter 21 or the SP register 22 and to the second address data route 24 for receiving an immediate address from the prefetch que 10 (see FIG. 2). Therefore, in the case of the register indirect with displacement addressing mode, in which a target address is obtained by adding the data stored in the program counter 21 or the SP register 22 to the immediate address set in the instruction code, it is possible to calculate the target address using the address adder 25. In cycle 2, the predecoder 14 determines whether the addressing mode called for by the instruction B is the register indirect with displacement addressing mode. The predecoder 14 controls the first and second address data routes 23 and 24, the address adder 25 and the ALU 35 in accordance with the result of determination. With this arrangement, the address adder 25 is caused to perform an address calculation when the register indirect with displacement addressing mode is specified. In the event that an addressing mode other than the register indirect with displacement addressing mode is specified, the ALU 35 performs an address calculation.

In the example of FIG. 3, it is assumed that the instruction B calls for the register indirect with displacement addressing mode so that the address of the operand for the instruction B is calculated by the address adder 25 in cycle 2. As can be seen in FIG. 2, the address adder 25 and the first and second address data routes 23 and 24 can be operated in a manner independent of the ALU 35 used in the computational stage, the internal data bus 40, the general registers 36 and 37. Accordingly, the address calculation for the instruction B is executed in the same cycle 2 as the computation using the operand for the instruction A. An obvious benefit derived from this is that the number of cycles required for execution of an instruction is reduced by one, as compared to the pipeline process of the related art shown in FIG. 1. Since only a single addition operation is required in address calculation of the register indirect with displacement addressing mode, the address adder 25 invariably completes an address calculation in one cycle.

The address of the operand for the instruction B calculated thus is temporarily stored in the address storage register 30 and output from the CPU via the internal address bus 32. Responsive to this, the operand stored in a memory external to the CPU is retrieved and transferred to the ALU 35, and the general registers 36 and 37 via the internal bus 40.

In the subsequent cycle 3, the instruction B proceeds to the computation stage where the ALU 35 executes a computation using the operand retrieved from the external memory, based on the result of decoding the instruction B by the main decoder 16.

If the predecoder 14 determines in cycle 2 that the ALU 35, instead of the address adder 25, is to calculate the address, address calculation for the instruction B is performed after the computation stage for the instruction A is completed, as shown in FIG. 1.

A write-after-read hazard in the pipeline process may occur if the address is calculated using a value set in a register provided in the microprocessor, as is done in cycle 2 above. More specifically, there is a likelihood that, before an instruction updates a value in an internal register at a computational stage, a subsequent instruction may refer to the internal register. If such a referral occurs, an erroneous address calculation results. However, the embodiment confines internal registers used in address calculation to the program counter 21 and the SP register 22. The general registers 36 and 37 are not used in calculating the target address of the present invention. Thus, it is relatively easy to configure the pipeline process so as to ensure that data in the internal register used in address calculation is updated before it is read out via the route connected to the address adder 25. With this configuration, the write-after-read hazard can be avoided. One approach to implement such a configuration is to design the microprocessor hardware such that the input (writing of data) to the registers 21 and 22, which are used in address calculation, is completed in the first half of a cycle and the operation of the address adder 25 is timed to continue through the second half of a cycle. With this arrangement, updating of data in the registers 21 and 22 is completed in the first half of a cycle so that the write-after-read hazard is avoided. Alternatively, a microprogram controlling the CPU may be configured so as to prevent a value set in the registers used in address calculation from being updated in the last cycle for a given instruction. Taking the instruction A of FIG. 3 as an example, the microprogram may be configured so that the content of the program counter 21 and the SP register 22 is not updated in the computational stage in cycle 2.

In summary, according to the embodiment described above, address calculation for an instruction calling for the register indirect with displacement addressing mode can be performed concurrently with computation using an operand for an immediately preceding instruction and can be completed in one cycle (see FIG. 3). Therefore, the number of cycles required for execution of the instruction is reduced.

Addressing in which a target address is obtained by adding a value in the program counter 21 to an immediate address is frequently used in a relative jump specified by a branch instruction. Addressing in which a target address is obtained by adding a value in the SP register 22 to the immediate address is frequently used when information stored in a stack is referred to. Reduction in the number of cycles required for execution of instructions calling for these types of addressing provides a significant contribution to the improvement of the processing speed of the microprocessor. Since the address adder 25 performs an address calculation only in limited types of addressing modes, such an improvement can be achieved by hardware expansion on a relatively limited scale, that is, primarily by adding the address adder 25, characterized by a simple construction, to the existing hardware.

The address adder 25 performing an address calculation according to the above embodiment refers not to the general register but to the program counter 21 or the SP register 22. In other words, address calculation performed concurrently with computation using an operand for a different instruction uses the program counter 21 or the SP register 22 instead of the general register. Therefore, it is relatively easy to configure the data in the internal register used in address calculation to be updated before it is read out via the route connected to the address adder 25. The conventional measures (stalling and bypassing) against a hazard as described previously are unnecessary. Accordingly, it is possible to prevent a hazard from occurring while preventing pipeline process control from becoming excessively complex.

While the embodiment described above uses the program counter 21 and the SP register 22 for the address adder 25 to calculate an address, other internal registers excluding the general registers may also be used to calculate an address. For example, a frame pointer register (hereinafter, referred to as an FP register) may be used, if it is included in a microprocessor, for address calculation in addition to or in place of the program counter 21 and the SP register 22. In this case, the FP register is connected to the first address data route 23 so that address calculation for an instruction, whereby an immediate address is added to a value set in the frame pointer register in accordance with the register indirect with displacement addressing mode, is performed concurrently with computation using an operand for an immediately preceding instruction and is completed in one cycle. For this reason, the number of cycles required for execution of the instruction is reduced. Addressing whereby a value in the frame pointer register is added to the immediate address is frequently used to refer to information in a stack frame created by a function call (subroutine call) of a high-level language. Therefore, such a reduction contributes significantly to the improvement of the processing speed of the microprocessor.

An approach similar to the one described previously may be used to configure the content of the frame pointer register, used for address calculation, to be updated before the content is read via the first address data route 23. Accordingly, it is possible to prevent a hazard from occurring while preventing pipeline process control from becoming excessively complex.

The present invention is not limited to the above described embodiments, and variations and modifications may be made without departing from the scope of the present invention.

What is claimed is:

1. A central processing unit for performing a pipeline process by dividing a sequence including reading, decoding and executing an instruction into different stages, comprising:

a plurality of registers;

an arithmetic and logic unit for performing a computation using an operand for an instruction to be executed, an adder dedicated to address calculation provided separately from said arithmetic and logic unit so as to calculate an address of said operand;

a first data route electrically connected at least between at least one of said plurality of registers and said adder for transferring data stored in a specific one of said plurality of registers to said adder;

a second data route electrically connected at least between an immediate address que and said adder for transferring an immediate address of the instruction to be executed set in said immediate address que to said adder;

a predecoder for determining whether said address of said operand for said instruction can be calculated by adding said immediate address to the data stored in said specific register, wherein when said predecoder yields an affirmative answer, the data stored in said specific register is transferred to said adder via said first data route, and said immediate address is transferred to said adder via said second data route, so as to cause said adder to calculate said address based on the data and said immediate address transferred to said adder.

2. The central processing unit as claimed in claim 1, wherein said specific register is a program counter.

3. The central processing unit as claimed in claim 1, wherein said specific register is a stack pointer register.

4. The central processing unit as claimed in claim 1, wherein said specific register is a frame pointer register.

5. A central processing unit for performing a pipeline process by dividing a sequence including reading, decoding and executing an instruction into different stages, comprising:

a plurality of registers;

arithmetic and logic means for performing a computation using an operand for an instruction to be executed;

adder means dedicated to address calculation provided separately from said arithmetic and logic means to calculate an address of said operand;

a first data route electrically connected at least between at least one of said plurality of registers and said adder means for transferring data stored in a specific one of said plurality of registers to said adder means;

a second data route electrically connected at least between an immediate address que and said adder means for transferring an immediate address of the instruction to be executed set in said immediate address que to said adder means; and predecoder means for determining whether said address of said operand for said instruction can be calculated by adding said immediate address to the data stored in said specific register, wherein when said predecoder means yields an affirmative answer, the data stored in said specific register is transferred to said adder means via said first data route, and said immediate address is transferred to said adder means via said second data route, so as to cause said adder means to calculate said address based on the data and said immediate address transferred to said adder means.

6. A method for performing a pipeline process by dividing a sequence including reading, decoding and executing an instruction into different stages, comprising steps of:

performing a computation using an operand for an instruction to be executed;

calculating in an adder an address of said operand;

providing a first data route electrically connected at least between at least one of a plurality of registers and the adder for transferring data stored in a specific one of the plurality of registers to the adder;

providing a second data route electrically connected at least between an immediate address que and the said adder for transferring an immediate address of the instruction to be executed set in the immediate address que to the adder; and determining whether said address of said operand for said instruction can be calculated by adding said immediate address to the data stored in the specific register, wherein when said determining step yields an affirmative answer, the data stored in the specific register is transferred to the adder via the first data route, and said immediate address is transferred to the adder via the second data route, so as to cause the adder to calculate said address based on the data and said immediate address transferred to the adder.

* * * * *